United States Patent
Mujumdar et al.

(10) Patent No.: US 8,523,432 B2
(45) Date of Patent: Sep. 3, 2013

(54) THERMALLY ISOLATED TEMPERATURE SENSOR

(75) Inventors: Kishor Mujumdar, Bangalore (IN); Guruprasad Krishnamurthy, Bangalore (IN); Jamie Boyd, Symington (GB)

(73) Assignee: Honeywell International Inc., Morristown, NJ (US)

( * ) Notice: Subject to any disclaimer, the term of this patent is extended or adjusted under 35 U.S.C. 154(b) by 113 days.

(21) Appl. No.: 13/021,248

(22) Filed: Feb. 4, 2011

(65) Prior Publication Data
US 2012/0201269 A1   Aug. 9, 2012

(51) Int. Cl.
*G01K 1/08* (2006.01)
*G01K 1/14* (2006.01)

(52) U.S. Cl.
USPC ............................ 374/208; 374/163; 374/141

(58) Field of Classification Search
USPC ................ 374/163, 179, 185, 208, 100, 141, 374/144, 145, 148; 73/866.5
See application file for complete search history.

(56) References Cited

U.S. PATENT DOCUMENTS

| | | | | |
|---|---|---|---|---|
| 2,967,428 | A * | 1/1961 | Burgert | 374/155 |
| 4,002,924 | A | 1/1977 | Busch | |
| 4,179,309 | A * | 12/1979 | Hance et al. | 136/234 |
| 4,246,786 | A * | 1/1981 | Wiemer et al. | 374/165 |
| 4,282,754 | A | 8/1981 | Provasnik | |
| 4,526,481 | A | 7/1985 | Hansen | |
| 4,622,851 | A | 11/1986 | Wilson | |
| 4,688,949 | A | 8/1987 | Hatakenaka | |
| 4,841,274 | A * | 6/1989 | Yagher et al. | 338/28 |
| 5,046,857 | A * | 9/1991 | Metzger et al. | 374/135 |
| 5,048,974 | A | 9/1991 | Dupuy | |
| 5,733,044 | A | 3/1998 | Rose et al. | |
| 5,749,656 | A * | 5/1998 | Boehm et al. | 374/185 |
| 5,753,835 | A * | 5/1998 | Gustin | 73/866.5 |
| 5,844,135 | A | 12/1998 | Brammer et al. | |
| 6,588,931 | B2 * | 7/2003 | Betzner et al. | 374/185 |
| 6,666,077 | B2 | 12/2003 | Bauer et al. | |
| 6,860,635 | B2 * | 3/2005 | Muziol et al. | 374/185 |
| 7,017,434 | B2 | 3/2006 | Grundmann | |
| 7,124,731 | B2 | 10/2006 | Eguchi et al. | |
| 7,147,369 | B2 * | 12/2006 | Gadonniex et al. | 374/208 |
| 7,740,403 | B2 * | 6/2010 | Irrgang et al. | 374/185 |
| 7,748,898 | B2 * | 7/2010 | Toudou et al. | 374/208 |
| 8,029,188 | B2 * | 10/2011 | Park | 374/141 |
| 8,047,054 | B2 * | 11/2011 | Below | 73/28.01 |
| 8,256,956 | B2 * | 9/2012 | Suzuki et al. | 374/185 |
| 2002/0006155 | A1 * | 1/2002 | Wienand et al. | 374/185 |
| 2003/0067960 | A1 * | 4/2003 | Nyffenegger et al. | 374/143 |
| 2008/0105068 | A1 * | 5/2008 | Yui | 73/866.5 |

* cited by examiner

*Primary Examiner* — Gail Verbitsky
(74) *Attorney, Agent, or Firm* — Thompson Patent Law Offices PC; Craige Thompson

(57) ABSTRACT

A temperature sensor includes a polymer body for mounting the sensor to a mounting surface and positioning a temperature sensing element within a target fluid. The temperature sensing element may be positioned at the distal end of the polymer body and may be sealed from the fluid by a metal cap filled with a thermally conductive material. In this manner, the polymer body may thermally insulate the temperature sensing element and lead conductors within the polymer body from the mounting surface. The polymer body may also include a connector on the proximal end to facilitate an electrical connection with the temperature sensing element, a flange to install the sensor against the mounting surface, and a fixation surface configured to mate with the mounting surface. In some examples, the polymer body may be constructed in two stages to facilitate different configurations of the connector, flange, and/or fixation surface.

20 Claims, 10 Drawing Sheets

THERMALLY ISOLATED TEMPERATURE SENSOR

TECHNICAL FIELD

This disclosure relates to sensors, and more particularly to temperature sensors.

BACKGROUND

Temperature sensors are commonly used to provide feedback regarding the temperature of a fluid. Some temperature sensors are mounted within a structure to detect the temperature of a fluid held within the structure or flowing within the structure. In internal combustion engines, for example, temperature sensors may be used to monitor the temperature of oil, coolant, and even fuel. An oil temperature sensor, for example, having a metal probe may be mounted within an opening in the engine block such that metal threads from the sensor mate to threads of the mounting surface of the engine block. The metal probe for measuring the oil temperature is thus positioned within an oil return passage of the engine block. An electrical connector is typically connected to the temperature sensor to relay signals from the temperature sensor to a control circuit located remotely from the engine block. Various other temperature sensors may also be located within the engine block or associated with fluids used by the internal combustion engine. A wide variety of other devices and structures may use temperature sensors similar to those used in engines.

SUMMARY

In general, the disclosure describes devices for measuring temperature of a target fluid while minimizing thermal interference from a mounting surface. For example, a temperature sensor may include a polymer body for mounting the sensor to the mounting surface and for positioning a temperature sensing element within the target fluid. The polymer body may limit thermal conductivity as compared to other materials, e.g., metals and metal alloys. Therefore, the polymer body may thermally isolate the temperature sensing element and lead conductors within the polymer body from the mounting surface.

A temperature sensing element may be positioned at the distal end of the polymer body and may be sealed from the fluid by a thermally conductive cap. In some examples, the thermally conductive cap may be filled with a thermally conductive material to thermally couple the sensing element to the thermally conductive cap. The thermally conductive cap may be a metal cap in some examples. The polymer body may also include a connector portion on the proximal end of the polymer body, i.e., opposite of the sensing element, to facilitate an electrical connection with the temperature sensing element. The polymer body may also include a flange to install the sensor against the mounting surface and a fixation surface configured to mate with the mounting surface. In other examples, the polymer body may be constructed in two stages. The first stage may create an inner polymer body that molds around the lead conductors. The second stage may be molded over the inner polymer body to create various configurations of the connector, flange, and/or fixation surface while maintaining a uniform inner polymer body, temperature sensing element, and metal cap configuration between variations. The resulting thermal isolation of the thermally conductive cap may provide a more accurate temperature measurement and a faster response time than is possible with devices not thermally insulated from the mounting surface.

In one example of the disclosure, a temperature sensor includes a polymer body defining at least one lead channel and including a connector portion at a proximal end of the polymer body, a terminal protrusion disposed at a distal end of the polymer body, a flange disposed between the proximal end and the distal end of the polymer body, wherein the flange is configured to mate with an assembly tool, and a fixation surface disposed between the flange and the distal end of the polymer body. The temperature sensor also includes at least one lead conductor disposed within the at least one lead channel, a temperature sensing element electrically coupled to the at least one lead conductor and configured to detect a temperature of a fluid, and a thermally conductive cap disposed over the temperature sensing element and at least a portion of the terminal protrusion, wherein the thermally conductive cap is configured to seal the temperature sensing element from the fluid.

In another example of the disclosure, a device includes an inner polymer body defining at least a portion of one or more lead channels and including a terminal protrusion disposed at a distal end of the inner polymer body and an outer polymer body surrounding a portion of the inner polymer body. The outer polymer body includes a connector portion at a proximal end of the outer polymer body, a threaded fixation surface at a distal end of the outer polymer body, wherein at least a portion of the threaded fixation surface surrounds the portion of the inner polymer body, and a flange disposed between the proximal end and the distal end of the outer polymer body, wherein the flange is configured to mate with an assembly tool. The device also includes at least one lead conductor disposed within the one or more lead channels, a temperature sensing element electrically coupled to the at least one lead conductor and configured to detect a temperature of a fluid, and a thermally conductive cap disposed over the temperature sensing element and at least a portion of the terminal protrusion, wherein the thermally conductive cap is configured to seal the temperature sensing element from the fluid.

In an additional example of the disclosure, a method includes molding a first polymer over at least one lead conductor to create an inner polymer body, welding a temperate sensor element to the at least one lead conductor, covering the temperature sensor element with a thermally conductive cap filled with a thermally conductive material, and securing the thermally conductive cap to a protrusion of the inner polymer body proximate to the temperature sensor element. The method also includes molding a second polymer over at least a portion of the inner polymer body to create an outer polymer body, wherein the outer polymer body comprises a connector portion disposed at a proximal end of the outer polymer body, a threaded fixation surface disposed at a distal end of the outer polymer body proximate to the temperature sensor element, and a flange disposed between the proximal end and the distal end of the outer polymer body.

The details of one or more implementations are set forth in the accompanying drawings and the description below. Other features, objects, and advantages will be apparent from the description and drawings, and from the claims.

DETAILED DESCRIPTION

Figure 1:
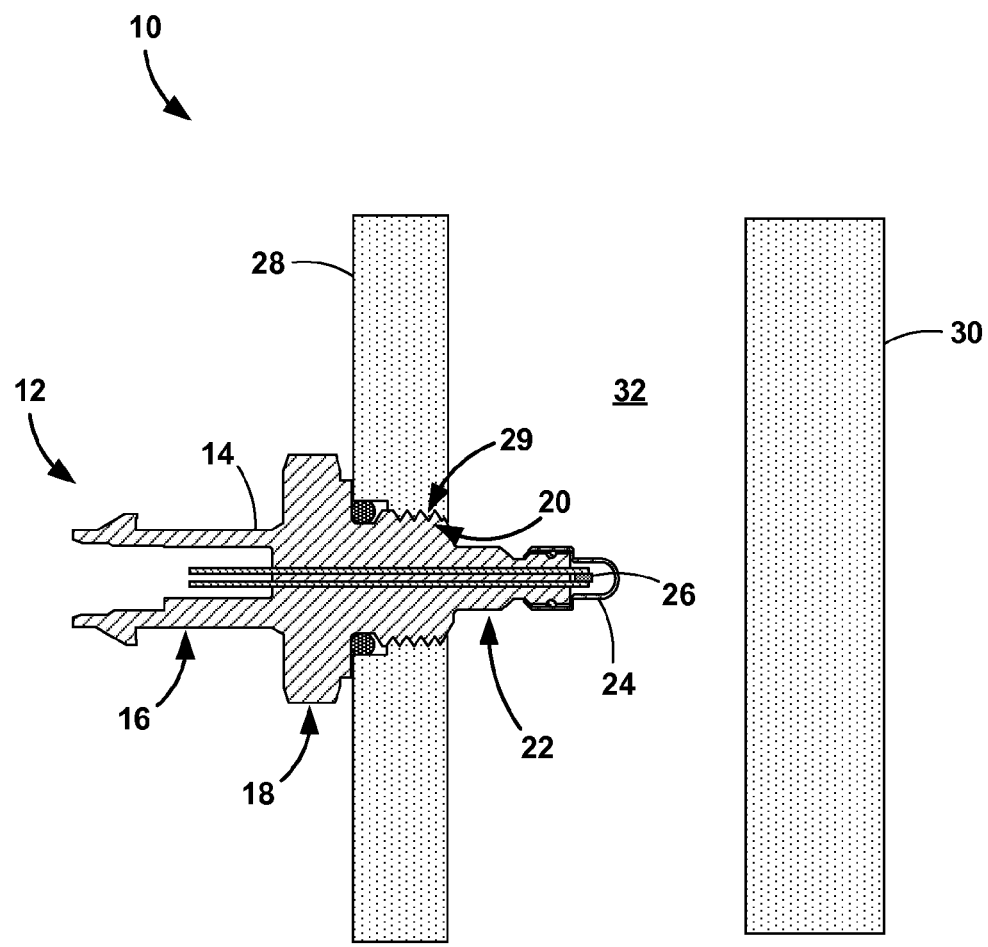
FIG. 1 is a conceptual diagram of an example system that includes a temperature sensor mounted within a structure to measure the temperature of a fluid.

In general, the disclosure describes devices for measuring temperature of a target fluid while minimizing thermal interference from a mounting surface that secures the device. Temperature sensors may include a sensing or detection element capable of accurately measuring the temperature of a fluid, but the measured fluid temperature may be affected by the temperature of a structure to which the sensor is mounted. In other words, heat from the structure may be conducted through the body of the temperature sensor to the sensing element and/or the lead conductors electrically coupling the sensing element to a connector. This temperature gradient error may be exacerbated when the threads (e.g., fixation surface) of the temperature sensor mounting the sensor to the structure are formed of a continuous metal material also surrounding the temperature sensing element within the fluid.

For example, temperature sensors may be mounted within an engine block of an internal combustion engine to measure the temperature of oil, fuel, or coolant flowing within the engine block. Since the temperature of the engine block is not always the same as the temperature of the measured fluid, a low temperature gradient may be induced between the fixation surface of the temperature sensor and the temperature sensing element and/or lead conductors within the sensor. Temperature gradient errors in temperature sensors may be common with mounting structures having high heat capacities, e.g., engine blocks, because the structure may maintain high temperature differences with respect to the fluid to be measured. Temperature gradient errors may also be greater when the volume of fluid being measured is small with respect to the surface area of the mounting structure contacting the body of the temperature sensor.

As described in more detail below, a temperature sensor may include a polymer body for mounting the sensor to the mounting surface of a structure and positioning a temperature sensing element in contact with the target fluid. Since the polymer body may limit thermal conductivity as compared to other materials, e.g., metals and metal alloys, the polymer body may thermally insulate the temperature sensing element and lead conductors within the polymer body from the mounting surface. The temperature sensing element may be positioned at the distal end of the polymer body and may be sealed from the fluid by a thermally conductive cap, e.g., a metal cap, a thermally conductive epoxy, or a thermally conductive thermoplastic. In some examples, the metal cap may be filled with a thermally conductive material to thermally couple the sensing element to the metal cap. In contrast to the thermally insulative polymer body, the metal cap and thermally conductive material may promote high thermal conductivity that allows the temperature sensing element to respond quickly to any changes in the temperature of the fluid. In addition, the surface area and volume of the metal cap may be minimized to reduce the heat capacity of the metal cap and increase the response of the temperature sensing element to temperature changes.

The polymer body may of the temperature sensor may include a connector portion on the proximal end of the polymer body, i.e., opposite of the sensing element, to facilitate an electrical connection with the temperature sensing element. The polymer body may include a flange, e.g., a hexagonal exterior surface, to install the sensor against the mounting surface and a fixation surface, e.g., a threaded structure, configured to mate with the mounting surface. In some examples, the polymer body may be constructed in two stages. The first stage may create an inner polymer body that molds around the lead conductors and supports the temperature sensing element and the metal cap. The second stage may create an outer polymer body molded over a portion of the inner polymer body. In this manner, the outer polymer body may be formed to create different configurations of the connector, flange, and/or fixation surface while maintaining a uniform inner polymer body, temperature sensing element, and thermally conductive cap configuration between variations of the temperature sensor.

FIG. 1 is a conceptual diagram of example system 10 that includes temperature sensor 12 mounted within wall 28 to measure the temperature of fluid 32. As shown in FIG. 1, system 10 includes temperature sensor 12, walls 28 and 30, and fluid 32. System 10 may be any combination of temperature sensor 12 and a structure that either contains fluid 32 or allows fluid 32 to flow between walls 28 and 30 of the structure, an engine block. Therefore, system 10 may be an internal combustion engine or any other system in which a temperature sensor is used to monitor the temperature of a fluid.

Temperature sensor 12 may include polymer body 14, metal cap 24, and temperature sensing element 26. Polymer body 14 includes several sections, e.g., connector portion 16, flange 18, fixation surface 20, and terminal protrusion 22, designed to perform various functions associated with temperature sensor 12. Connector portion 16 may be configured to accept an electrical connector that electrically couples to temperature sensing element 26. Flange 18 may be configured to mate with an assembly tool to install temperature sensor 12 within wall 28, e.g., flange 18 may have a hexagonal exterior surface. Fixation surface 20 may be configured to mate with mounting surface 29 and secure temperature sensor 12 within wall 28. In the example of FIG. 1, fixation surface 20 includes a threaded structure configured to mate with the threaded mounting surface 29. Polymer body 14 also includes terminal protrusion 22 disposed at the distal end of polymer body 14.

Temperature sensor 12 may also include metal cap 24. Metal cap 24 is disposed at the distal end of temperature sensor 12 and is configured to cover temperature sensing element 26. Metal cap 24 may also be attached to terminal protrusion 22 via crimping the edges of metal cap 24, an adhesive, or other fixation elements. In some examples, metal cap 24 may seal temperature sensing element 26 from fluid 32. Although metal cap 24 may itself be in contact with temperature sensing element 25, a conductive material may fill at least a portion of metal cap 24 and thermally couple metal cap 24 to temperature sensing element 25. In other examples, metal cap 24 may be constructed of a non-metallic thermally conductive material such as a thermally conductive epoxy or a thermally conductive thermoplastic.

Temperature sensing element 26 detects temperature of fluid 32 and generates an electrical signal representative of the detected temperature. In some examples, temperature sensing element 26 may be a thermistor, thermocouple, resistance temperature detector (RTD), or any other contact temperature sensor. The specific type of temperature sensing element 26 employed may depend upon the anticipated temperature range of fluid 32 and the chemical properties of fluid 32. Although temperature sensor 12 is generally described as including only one temperature sensing element 26, some examples of temperature sensor 12 may include two or more temperature sensing elements. When multiple temperature sensing elements are employed, each element may be of the same type or a different type of sensing element. Multiple sensing elements may also enable temperature sensor 12 to accurately measure temperatures in a wider temperature range with one sensing element configured for one temperature range and another sensing element configured for a different, or partially overlapping, temperature range.

Temperature sensor 12 is mounted within an opening in wall 28. In the example of FIG. 1, mounting surface 29 of wall 28 defines the opening in wall 28, and mounting surface 29 is threaded to accept the treaded structure of fixation surface 20. In this manner, temperature sensor 12 is mated to mounting surface 29 of wall 28 with a threaded fixation mechanism. In other examples, temperature sensor 12 may mounted to or within wall 28 with other fixation methods. For examples, fixation surface 20 may employ other rotating mechanisms, e.g., a Luer Lock, an adhesive, a snap fit, one or more pins or screws, or any other types of mechanical or chemical fixation techniques. In addition to, or instead of, fixation surface 20, system 10 may employ a latch or other structure configured to retain flange 18 against wall 28, in some examples.

Although temperature sensor 12 may be generally described as protruding into a channel or reservoir containing fluid 32, temperature sensor 12 may be recessed away from the main flow of fluid 32. For example, wall 28 may form a cavity of fluid 32 so that metal cap 24 remains out of the main flow of fluid 32 when temperature sensor 12 is installed within wall 28. In any example, metal cap 24 may be kept from contacting walls 28 or 30 to prevent thermal conduction from either wall to temperature sensing element 26.

Fluid 32 may be any matter, e.g., a liquid or a gas, contained between walls 28 and 30 and/or allowed to move between walls 28 and 30. Temperature sensor 12 may completely occlude the opening in wall 28 defined by mounting surface 29 such that none of fluid 32 may escape around temperature sensor 12. Temperature sensor 12 may be employed in a wide variety of applications, e.g., system 10 may be an engine, a refrigeration unit, a heating system, a storage container, or a manufacturing process. For example, temperature sensor 12 is installed in an internal combustion engine to measure the temperature of a lubricant, a coolant, or a fuel associated with the internal combustion engine. In another example, temperature sensor 12 is mounted within a wall of an engine block to measure the temperature of diesel fuel.

Polymer body 14 is generally configured to include thermally insulating properties. In other words, polymer body 14 limits thermal conductivity from wall 28 to temperature sensing element 26 and the lead conductors within polymer body 14. Thermally insulating polymers may limit any thermal gradient errors in the measurement of fluid 32 temperature because energy from wall 28 has little effect on temperature sensing element 26 and the lead conductors within polymer body 14. As described in further detail herein, polymer body 14 may be constructed in multiple stages, with a single type of polymer, or with two or more types of polymers.

Although polymer body 14 is generally described herein as constructed completely of a polymer material, some examples may of temperature sensor 12 may include a main body constructed of other thermally insulating materials. For example, the main body of temperature sensor 12 may be constructed of a composite material. In other examples, the main body may be constructed of a polymer with various metals or composite materials embedded within the polymer. Any material that thermally insulates temperature sensing element 26 and the lead conductors from wall 28 may be used to construct the main body, e.g., polymer body 14, of temperature sensor 12.

Figure 2:
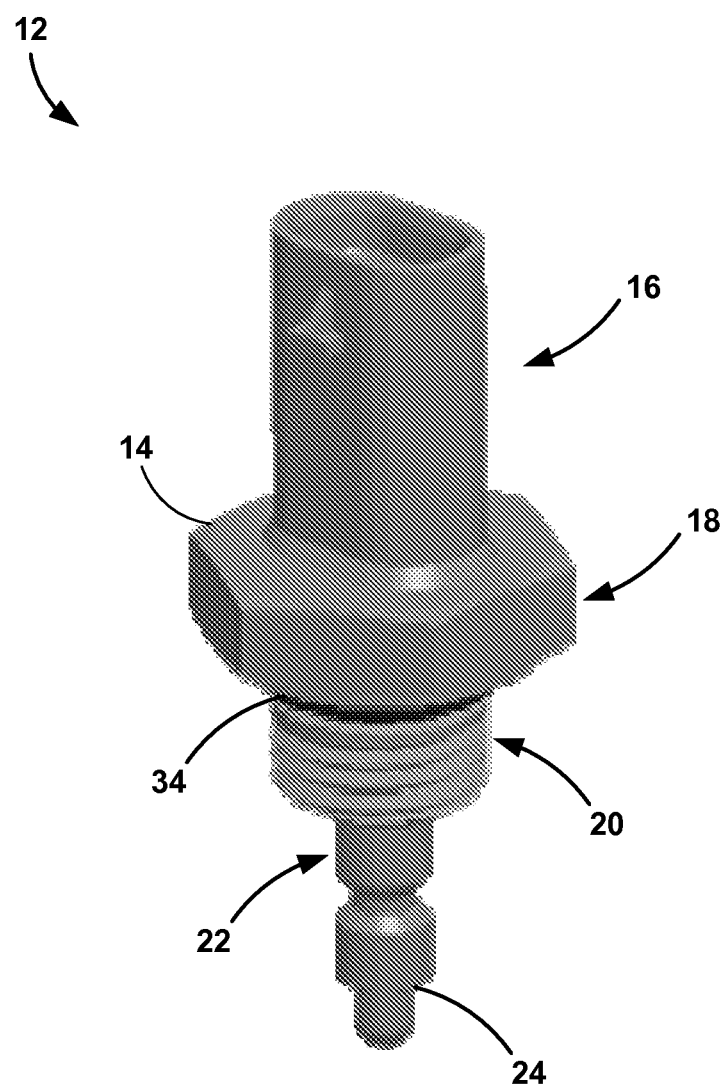
FIG. 2 is a perspective illustration of the temperature sensor of FIG. 1.

FIG. 2 is a perspective illustration of the exterior surface of temperature sensor 12 of FIG. 1. As shown in FIG. 2, the exterior of temperature sensor 12 includes polymer body 14, metal cap 24, and fluid seal 34. Polymer body 14 provides four different sections, including connector portion 16, flange 18, fixation surface 20, and terminal protrusion 22. Connector portion 16 is configured to mate with another electrical connector to transmit signals representative of the fluid temperature from the temperature sensing element 26 of FIG. 2. A monitoring or control system may then use the temperature signal to monitor the temperature of fluid 32 and/or adjust one or more systems in response to the measured temperature. Connector portion 16 may be molded to mate with any variety of electrical connector used in the art.

In the example of FIG. 2, flange 18 is configured with a hexagonal exterior surface that may be mated to an assembly tool, e.g., a socket wrench or crescent wrench, to screw temperature sensor 12 into position for detecting the temperature of a fluid. Accordingly, fixation structure 20 of polymer body 14 is configured with a threaded fixation structure, or threaded surface, to fix temperature sensor 12 to the desired structure. The threaded structure may be formed into any number of unique or commonly used thread types, e.g., a M12×1.25 metric standard thread. Terminal protrusion 22 extends away from fixation structure 20 to separate metal cap 24 from the mounting surface mated to fixation surface 20.

Metal cap 24 may seal temperature sensing element 26 of FIG. 1 from the fluid by attaching to a distal end of terminal protrusion 22. In this manner, terminal protrusion 22 may provide an attachment surface for a portion of metal cap 24. When temperature sensor 12 is positioned to measure the temperature of the fluid, only metal cap 24 and terminal protrusion 22 may be in contact with the fluid. In some examples, a portion of fixation structure 20 may also be in contact with the fluid if the length of fixation structure 20 is longer than the mounting surface of the structure. Fluid seal 34 may be an o-ring, adhesive, or other material that prevents fluid from escaping the structure once temperature sensor 12 is installed.

Figure 3:
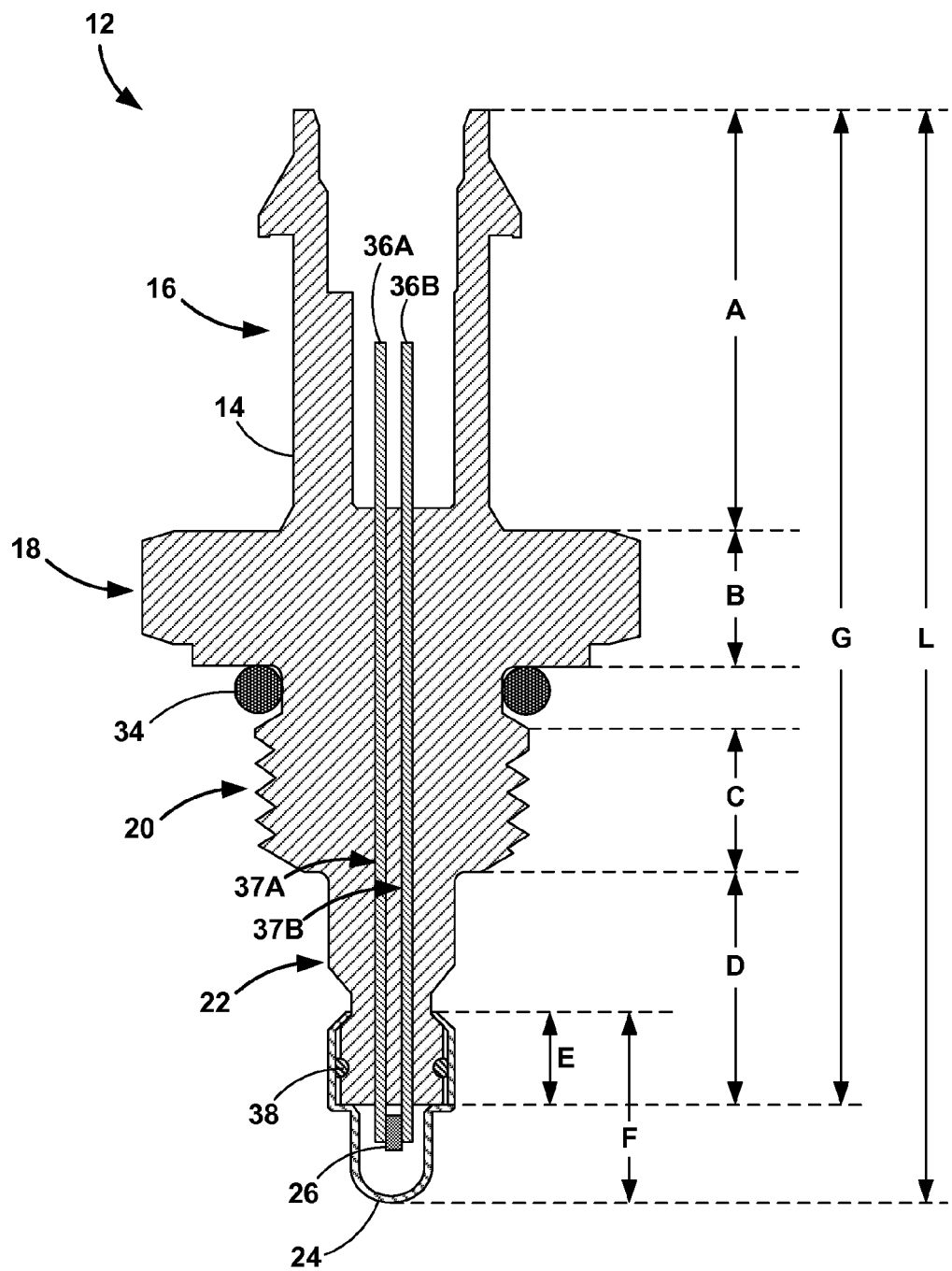
FIG. 3 is a cross-sectional diagram of the temperature sensor of FIG. 1.

FIG. 3 is a cross-sectional diagram of temperature sensor 12 of FIGS. 1 and 2. As shown in FIG. 3, temperature sensor 12 includes polymer body 14, metal cap 28, and temperature sensing element 26. In the example of FIG. 3, polymer body 14 is constructed of a single type of polymer. Although polymer body 14 may be constructed in one mold of the single type of polymer, polymer body 14 may be assembled in two or more sections and fixed together via adhesives, re-melting the polymer, male and female helical joints, or any other fixation methods. As described above, polymer body 14 includes connector portion 16, flange 18, fixation surface 20, and terminal protrusion 22.

In addition, temperature sensor 12 includes lead conductors 36A and 36B (collectively "conductors 36") electrically coupled to temperature sensing element 26. Conductors 36 may allow electrical power, e.g., voltage and current, to be supplied by an electrical connector (not shown) for operation of temperature sensing element 26. The electrical connector may be configured to mate with connector portion 16 and electrically couple with conductors 36. In the example of temperature sensor 12 providing oil temperature measurements for an internal combustion engine, an associated computer may use the temperature measurements, or raw signals indicative of temperature, to control one or more functions of the engine.

In other examples, conductors 36 may not themselves electrically couple temperature sensing element 26 to the electrical connector. Instead, a flexible or rigid printed circuit board (PCB) may couple temperature sensing element 26 to conductors 36. The PCB may at least partially reside within polymer body 14 and perform one or more functions for temperature sensing element 26. For example, the PCB may provide onboard calibration, signal filtering, or other features that allow an analog or digital signal to be transmitted directly from conductors 36. In other examples, temperature sensing element 26 may be integrated within the PCB such that a portion of the PCB resides within metal cap 26.

In other examples of temperature sensor 12, a different number of conductors 36 may be positioned within polymer body 14. For example, a single conductor may only be needed for temperature sensing element 26. Alternatively, three or more conductors may be used for one or more temperature sensing elements 26. In any case, polymer body 14 may support any number of conductors 36 needed to make use of one or more temperature sensing elements 26.

Conductors 36 are shown in FIG. 3 as individually molded into polymer body 14. In other words, polymer body 14 provides lead channel 37A for lead conductor 36A and lead channel 37B for lead conductor 36B. In this manner, each one of conductors 36 is disposed within their respective lead channels 37A and 37B. In other examples, two or more lead conductors may be disposed within a single lead channel. The lead conductors may be wrapped together and electrically insulated from each other within the lead channel. In any case, polymer body 14 provides a channel for conductors to pass through temperature sensor 12.

As described above, polymer body 14 includes connector portion 16 at the proximal end of polymer body 14 and temperature sensor 12. Terminal protrusion 22 is disposed at the distal end of polymer body 14, distal of fixation surface 20. Flange 18 of polymer body 14 is located between the proximal end and distal end of polymer body 14, distal of connector portion 16, and flange 18 is configured to mate with an assembly tool. Fixation surface 20 of polymer body 14 is also located between the proximal end and the distal end of polymer body 14, distal of flange 18 and proximal to terminal protrusion 22. Temperature sensing element 26 is located distal of, or beyond, terminal protrusion 22 and electrically coupled to conductors 36 to enable temperature sensing element 26 to detect a temperature of fluid contacting metal cap 24.

In the example of FIG. 3, flange 18 is configured with a hexagonal exterior surface around the circumference of polymer body 14. The hexagonal exterior surface may be used to mate with a socket wrench, crescent wrench, or any other assembly tool that provides leverage for screwing temperature sensor 12 into the desired structure when fixation surface 20 includes a threaded structure. Accordingly, the example of FIG. 3 provides a threaded structure as fixation surface 20. The treaded structure may be configured to mate with a threaded mounting surface of the adjacent structure or wall supporting temperature sensor 12. The threaded structure may be configured according to any standard or custom pitch and depth. In one example, fixation surface 20 may have a threaded structure that corresponds to the M12×1.25 metric standard.

Metal cap 24, e.g., a thermally conductive cap, is disposed over temperature sensing element 26 and the distal portion of terminal protrusion 22. Metal cap 24 is also shown with the edge of metal cap 24 crimped around the distal portion of terminal protrusion 22. Cap seal 38 may also be provided to ensure that no fluid passes between terminal protrusion 22 and metal cap 24. In this manner, metal cap 24 may seal temperature sensing element 26 from any fluid coming into contact with the exterior surface of metal cap 24. In other examples, cap seal 38 may not be provided in temperature sensor 12. In alternative examples, metal cap 24 may completely cover terminal protrusion 22. This type of configuration may be desired if metal cap 24 is to be placed within a small passage or limit flow resistance and/or disturbance to fluid passing over metal cap 24.

As described herein, metal cap 24 is thermally conducting so that energy from the target fluid may be readily transferred to temperature sensing element 26. A conductive material may also be provided within metal cap 24 to conduct energy between the target fluid and temperature sensing element 26. Metal cap 24 may allow temperature sensing element 26 to provide a fast response to any changes in temperature that occur within the fluid. As described herein, in other examples, metal cap 24 may be constructed of a non-metallic thermally conductive material such as a thermally conductive epoxy or a thermally conductive thermoplastic.

In contrast to metal cap 24, polymer body 14 may be constructed to thermally insulate temperature sensing element 26 and conductors 36 from a mounting surface that contacts fixation surface 20. Although polymers are generally less thermally conductive than metals or metal alloys, the type of polymer used for polymer body 14 may be selected to provide a low thermal conductivity while being compatible with the target fluid, both chemically and thermally. For example, some polymers may be used for high temperatures and other polymers may be used for low temperature fluids. In the example of an internal combustion engine, polymer body 14 may be constructed to structurally withstand temperatures up to 200 degrees Celsius.

Generally, metal cap 24 may be constructed of a single wall. Metal cap 24 may be drawn into an appropriate shape for enclosing temperature sensing element 26. The thickness of metal cap 24 may be between approximately 0.1 millimeters (mm) and 2.0 mm. However, any other smaller or larger thicknesses of metal cap 24 are also contemplated. For example, the thickness of metal cap 24 may be configured to withstand the pressures of the target fluid to prevent any damage to temperature sensing element 26. In other examples, metal cap 24 may be constructed of two or more walls, or layers. Each layer may contact each other, or a conductive material may be placed between the layers to conduct thermal energy from the fluid to temperature sensing element 26.

Temperature sensor 12 also includes fluid seal 34 disposed on the outer surface of polymer body 14 between flange 18 and fixation surface 20. Fluid seal 34 may be an o-ring, crush washer, adhesive, or other material that prevents fluid from escaping past temperature sensor 12 once the sensor is installed. Although fluid seal 34 may be provided when fixation surface 20 is configured as a threaded structure as shown in FIG. 3, some examples of temperature sensor 12 may not include fluid seal 34. For example, fluid seal 34 may not be necessary if fixation surface 20 is configured with an adhesive to prevent fluid from passing by polymer body 14.

The dimensions of temperature sensor 12 may varied to satisfy a wide range of applications for temperature sensor 12. Although example dimensions are provided herein, smaller and larger dimensions are also contemplated. Generally, the length (L) of temperature sensor 12 is between approximately 1.0 centimeters (cm) and 22.0 cm. In the example of FIG. 3, L is approximately equal to 6 cm. Accordingly, polymer body 14 may have a length (G) generally between approximately 1.0 cm and 20.0 cm. Since polymer body 14 may be segmented into different functional portions, the dimensions of each portion are provided. In general, connector portion 16 length (A) may be between approximately 0.3 cm and 10.0 cm. Flange 18 length (B) may be between approximately 0.1 cm and 3.0 cm. Fixation surface 20 length (C) may be between approximately 0.3 cm and 6.0 cm. Terminal protrusion 22 length (D) may be between approximately 0.2 cm and 8.0 cm.

Metal cap 24 may have a length (F) generally between approximately 0.1 cm and 5.0 cm. If thermal response time is desired to be minimal, smaller metal cap 24 dimensions may be beneficial. In some examples, metal cap length F may be less than the terminal protrusion length D. However, in an example of temperature sensor 12 with a small terminal protrusion 22, metal cap 24 length F may be greater than the length D of terminal protrusion 22. Generally, metal cap length F may be significantly less than polymer body length G. In some examples, metal cap length F may be less than approximately 25 percent of polymer body length G. For example, if polymer body 14 has a length G of approximately 4.0 cm, metal cap 24 may have a length less than approximately 1.0 cm.

Figure 4:
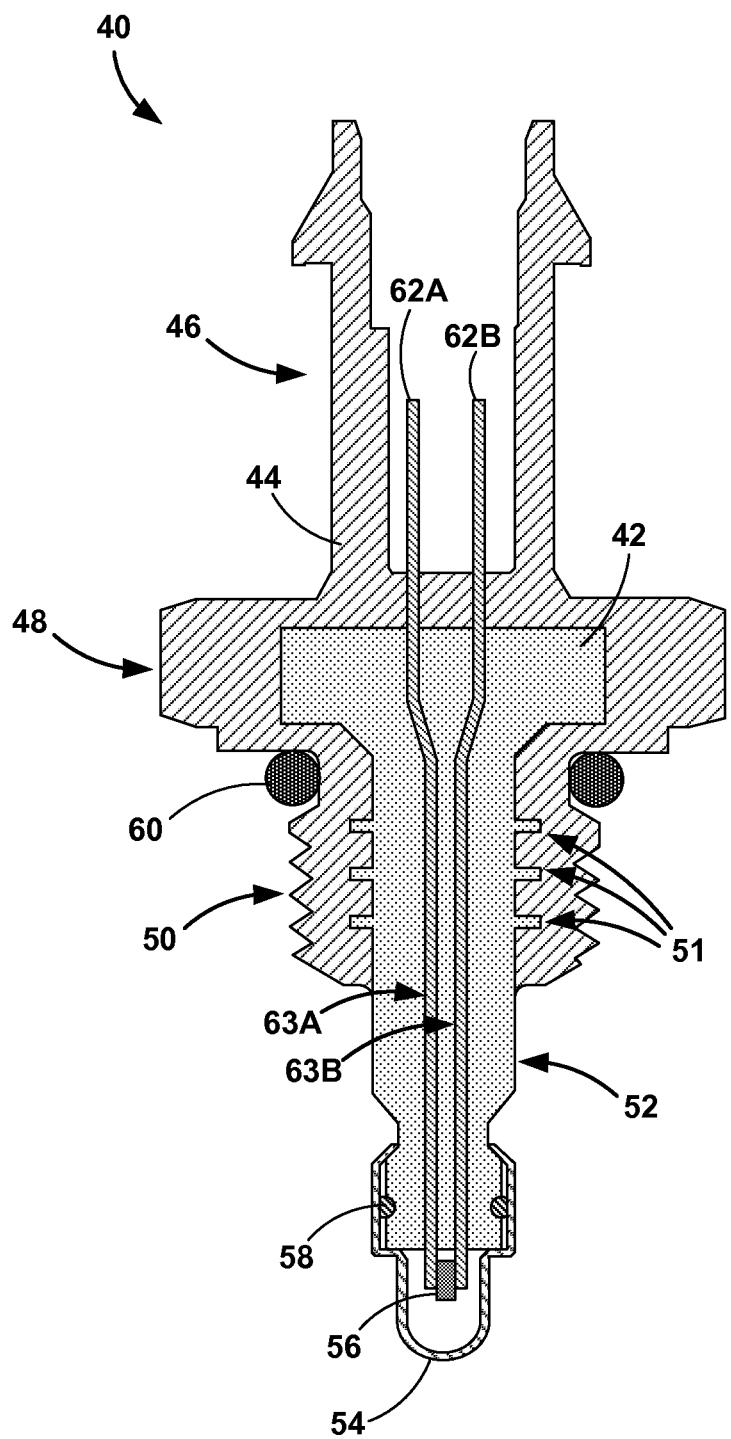
FIG. 4 is a cross-sectional diagram of an example temperature sensor having an inner polymer body and an outer polymer body.

FIG. 4 is a cross-sectional diagram of example temperature sensor 40 including inner polymer body 42 and outer polymer body 44. Temperature sensor 40 is similar to temperature sensor 12 of FIGS. 1-3. However, temperature sensor 40 includes inner polymer body 42 and an overmolded outer polymer body 44 instead of the single polymer body 14 of temperature sensor 12. As shown in FIG. 4, temperature sensor 40 includes inner polymer body 42, outer polymer body 44, metal cap 54, and temperature sensing element 56. Metal cap 54 may be substantially similar to metal cap 24 of FIG. 3 and temperature sensing element 56 may be substantially similar to temperature sensing element 26.

In the example of FIG. 4, both inner polymer body 42 and outer polymer body 44 are constructed of a polymer material. Although inner polymer body 42 and outer polymer body 44 may be constructed of a single type of polymer material, e.g., the same polymer material, inner polymer body 42 may be constructed of a different type of polymer material than that of outer polymer body 44. In some examples, similar, but not identical, polymer materials may be used to construct inner polymer body 42 and outer polymer body 44. For example, the similar polymers may be within the same class of polymers or exhibit properties that make the use of the two similar polymers possible for temperature sensor 12. Using the single type of polymer material for both inner and outer polymer bodies may promote adherence between each structure if outer polymer body 44 is molded over inner polymer body 42. In other words, outer polymer body 44 may at least partially fuse to inner polymer body 42 during the over mold process and create a seal between outer polymer body 44 and inner polymer body 42.

Using different types of polymer materials may be beneficial in other ways as well. For example, a less rigid polymer material may be used to construct outer polymer body 44 to facilitate mating with connector portion 46 and a more rigid polymer material may be used to construct inner polymer body 42 to withstand pressures, temperatures, and/or flow of the target fluid in contact with terminal protrusion 52. In another example, constructing temperature sensor 40 with an outer polymer body 44 and an inner polymer body 42 may facilitate mass production and interchangeability of parts. In other words, the same configuration of inner polymer body 44 may be used with different variations of outer polymer body 44 to create temperature sensors with varying connector portions 46, flanges 48, and/or fixation surfaces 50. Moreover, a single mold of outer polymer body 44 may be used over different molds of inner polymer body 42 to generate temperature sensors having different lengths, widths, or shapes of terminal protrusion 52 or even different types of temperature sensing elements 56 and/or thermally conductive caps 54. In this manner, for example, temperature sensor 50 may be configured for different applications without constructing separate polymer bodies for each application.

Although each of inner polymer body 42 and outer polymer body 44 may be constructed in one mold of the single type of polymer, one or both of inner polymer body 42 and outer polymer body 44 may be assembled in two or more sections and fixed together via adhesives, re-melting the polymer, male and female helical joints, or any other fixation methods. Together, inner polymer body 42 and outer polymer body 44 may include the same features polymer body 14 of FIG. 3. Inner polymer body 42 may include terminal protrusion 52. Outer polymer body 44 may include connector portion 46, flange 48, and fixation surface 50. In other examples, each one of bodies 42 and 44 may provide alternative features of temperature sensor 40.

In the example of FIG. 4, inner polymer body 42 may define at least a portion of lead channels 63A and 63B. Inner polymer body 42 may also include terminal protrusion 52 that is disposed at the distal end of inner polymer body 42. Outer polymer body 44 may also be configured to surround a portion of inner polymer body 42. In some examples, outer polymer body 44 may only surround the proximal portion of inner polymer body 42 opposite of metal cap 54. Generally, outer polymer body 44 may be molded over inner polymer body 42 after inner polymer body 42 is formed. However, outer polymer body 44 may also be constructed around a portion of inner polymer body 42 by joining two halves, or more than two sections, of outer polymer body 44 before adhering or otherwise securing outer polymer body 44 together. To promote structural integrity between inner polymer body 42 and outer polymer body 44, inner polymer body 42 may include one or more ridges 51 that extend into outer polymer body 44. In the example of FIG. 4, ridges 51 are provided within fixation surface 50 of outer polymer body 44.

Generally, terminal protrusion 52 of inner polymer body 42 may extend distally out from outer polymer body 44. In some examples, outer polymer body 44 may terminate even with the distal end of terminal protrusion 52. In other examples, outer polymer body 44 may be molded over, i.e., cover, a portion of metal cap 54. Molding outer polymer body 44 over a portion of metal cap 54 may also secure metal cap 54 to outer polymer body 44 and prevent fluid from getting within metal cap 54.

Outer polymer body 44 may include connector portion 46 at the proximal end of outer polymer body 44 and flange 48 located between connector portion 46 and the distal end of outer polymer body 44 and configured to mate with an assembly tool, e.g., a socket or crescent wrench. Outer polymer body 44 may also include fixation surface 50 located at the distal end of outer polymer body 44, e.g., distally of flange 48.

At least a portion of fixation surface 50 may be configured to surrounds a portion of inner polymer body 42. In the example of FIG. 4, fixation surface 50 is configured as a threaded fixation surface. The treaded structure may be configured to mate with a threaded mounting surface of the adjacent structure or wall supporting temperature sensor 40. The threaded structure may be configured according to any standard or custom pitch and depth. In one example, fixation surface 50 may have a threaded structure that corresponds to the M12× 1.25 metric standard.

Temperature sensor 12 also includes lead conductors 62A and 62B (collectively "conductors 62") electrically coupled to temperature sensing element 56. Inner polymer body 42 may define lead channels 63A and 63B through inner polymer body 42. In addition, outer polymer body 44 may define another portion of lead channels 63A and 63B through outer polymer body 44. Conductors 62 may be disposed within their respective lead channels 63A and 63B. In this manner, inner polymer body 42 and outer polymer body 44 may each be molded around a portion of conductors 62. In other examples, only inner polymer body 42 may define channels 63A and 63B and be molded around conductors 62.

In other examples of temperature sensor 40, a different number of conductors 62 may be positioned within inner polymer body 42 and outer polymer body 44. For example, a single conductor may only be needed for temperature sensing element 56. Alternatively, three or more conductors may be used for one or more temperature sensing elements 56. In any case, inner polymer body 42, and outer polymer body 44 in some examples, may support any number of conductors 62 needed to make use of one or more temperature sensing elements 56. Conductors 62 are shown in FIG. 4 as individually molded into inner polymer body 42 and outer polymer body 44. In other examples, two or more lead conductors may be disposed within a single lead channel. The lead conductors may be wrapped together and electrically insulated from each other within the lead channel.

Temperature sensing element 56 is located beyond the distal end of inner polymer body 42, e.g., distal of terminal protrusion 52. Temperature sensing element 56 is also electrically coupled to conductors 62 to enable temperature sensing element 56 to detect a temperature of fluid contacting metal cap 54. Metal cap 54 may be substantially similar to metal cap 24 of temperature sensor 12 in FIG. 3. Metal cap 54 is also disposed over temperature sensing element 56 and the distal portion of terminal protrusion 52. Metal cap 54 is also shown with the edge of metal cap 54 crimped around the distal portion of terminal protrusion 52 provided by inner polymer body 42. Cap seal 58 may also be provided to ensure that no fluid passes between terminal protrusion 52 and metal cap 54. In this manner, metal cap 54 may seal temperature sensing element 56 from any fluid coming into contact with the exterior surface of metal cap 54. In alternative examples, metal cap 54 may completely cover terminal protrusion 52 such that metal cap 54 is to be placed within a small passage or limit flow resistance and/or disturbance to fluid passing over metal cap 54. Generally, metal cap 24 of FIG. 3 or metal cap 54 may be a means for sealing temperature sensing element 26 or 56, respectively, from the target fluid.

Temperature sensor 40 also includes fluid seal 60 disposed on the outer surface of outer polymer body 44 between flange 48 and fixation surface 50. Fluid seal 60 may be substantially similar to fluid seal 34 of temperature sensor 12 shown in FIG. 3.

Similar to polymer body 14, inner polymer body 42 and outer polymer body 44 may be configured to thermally insulate temperature sensing element 56 and conductors 62 from the mounting surface that contacts fixation surface 50. In this manner, inner polymer body 42 and outer polymer body 44 may both reduce any thermal gradient errors in the measurement of the target fluid temperature.

Figure 5:
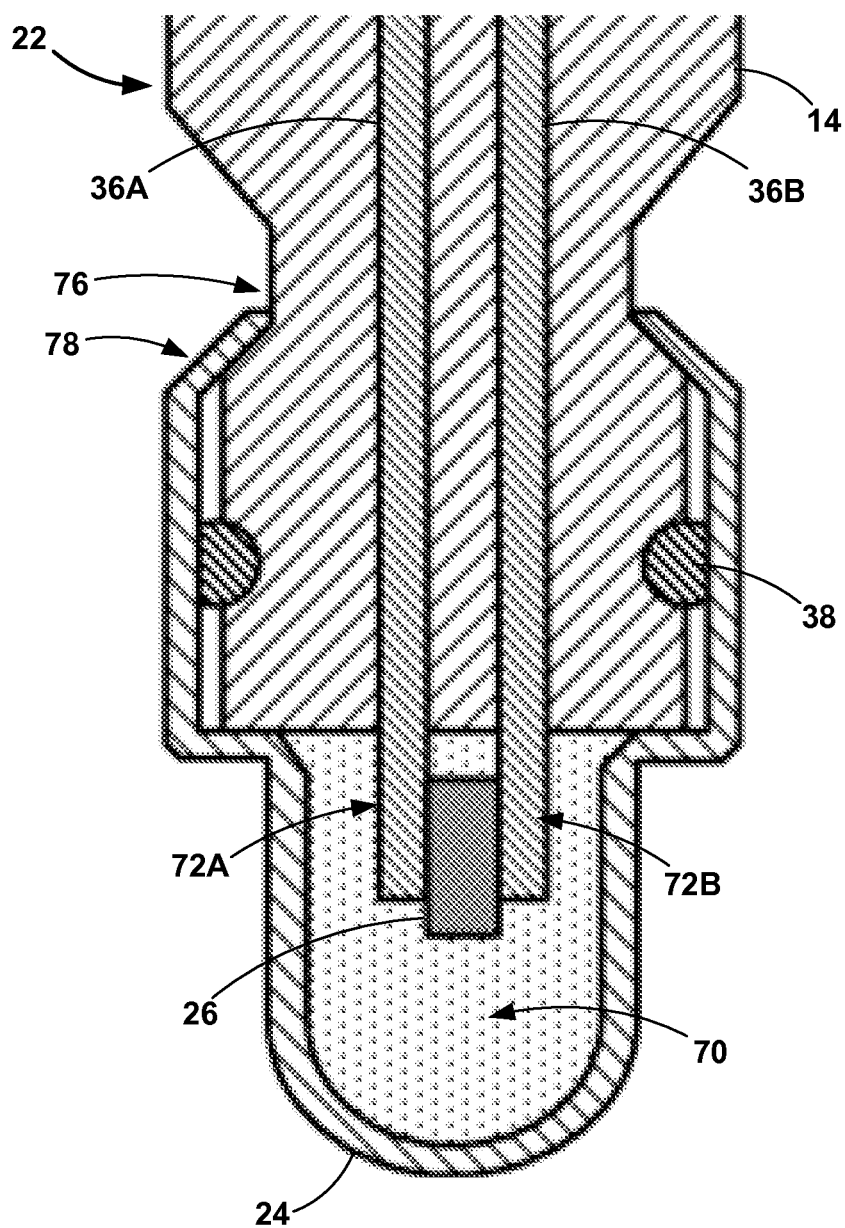
FIG. 5 is a cross-sectional diagram of an example temperature sensing element at the distal tip of a temperature sensor.

FIG. 5 is a cross-sectional diagram of temperature sensing element 26 at the distal tip of example temperature sensor 12. Although FIG. 5 is described with respect to temperature sensor 12, temperature sensor 40 may alternatively be used. As shown in FIG. 5, metal cap 24 is disposed over the distal end of terminal protrusion 22 of polymer body 14. Conductors 36 are also disposed within polymer body 14 and electrically coupled to temperature sensing element 26. Distal end 72A of conductor 36A and distal end 72B of conductor 36B may be resistance welded, or otherwise bonded, to temperature sensing element 26.

As described herein, in some examples, a flexible or rigid printed circuit board (PCB) may couple temperature sensing element 26 to conductors 36. In other examples, the PCB may include temperature sensing element 26. The PCB may at least partially reside within polymer body 14 and perform one or more functions for temperature sensing element 26. For example, the PCB may provide onboard calibration, signal filtering, or other features that allow an analog or digital signal to be transmitted directly from conductors 36.

In addition to metal cap 24 sealing temperature sensing element 26 from target fluid, thermally conductive material 70 may be disposed within metal cap 24. Thermally conductive material 70 may contact temperature sensing element 26 and the inner surface of metal cap 24 so that temperature sensing element 26 is thermally coupled to metal cap 24. Thermally conductive material 70 may be a thermally conductive paste, fluid, gel, resin, adhesive, or any other suitable material. The use of thermally conductive material 70 may help to decrease the thermal response time between the target fluid and temperature sensing element 26 to minimize any delay in measuring changes in fluid temperature.

As described herein, metal cap 24 and thermally conductive material 70 may promote high thermal conductivity that allows temperature sensing element 26 to respond quickly to any changes in the temperature of the target fluid. A small surface area and volume of metal cap 24 may reduce the heat capacity of the metal cap and increase the response of temperature sensing element 26 to temperature changes in the target fluid. Accordingly, metal cap 24 may be constructed as small as possible and a minimal volume of thermally conductive material 70 may be used in temperature sensor 12 in some examples.

Although thermally conductive material 70 may also adhere metal cap 24 to the distal end of terminal protrusion 22, metal cap 24 may also be attached to terminal protrusion 22. In the example of FIG. 5, terminal protrusion 22 may include narrow portion 76 that is a smaller diameter than the rest of terminal protrusion 22. Cap edge 78 may be crimped, folded, bent or otherwise mated to narrow portion 76. Therefore, cap edge 78 is secured to terminal protrusion 22 via contact between cap edge 78 and narrow portion 76. In addition, cap seal 38 may provide an additional seal to prevent fluid from entering metal cap 24.

As indicated above, metal cap 24 may generally be small in comparison to the rest of temperature sensor 12. For example, a longitudinal length of metal cap 24 may be less then the length of terminal protrusion 22. In another example, the length of metal cap 24 may be less than 25 percent of the length of polymer body 14. In other examples, the length of metal cap 24 may be between approximately 2 percent and 40 percent of the polymer body 14 length.

As described herein, metal cap 24 may generally be constructed of a single wall. Metal cap 24 may be drawn into an appropriate shape, e.g., a metal tube, for enclosing temperature sensing element 26. The thickness of metal cap 24 may be between approximately 0.1 millimeters (mm) and 2.0 mm. However, any other smaller or larger thicknesses of metal cap 24 are also contemplated. For example, the thickness of metal cap 24 may be configured to withstand the pressures of the target fluid to prevent any damage to temperature sensing element 26. In other examples, metal cap 24 may be constructed of two or more walls, or layers. Each layer may contact each other, or a conductive material may be placed between the layers to conduct thermal energy from the fluid to temperature sensing element 26.

Although metal cap 24 is shown with a semi-spherical tip, metal cap 24 may be constructed in any shape suitable for measuring the target fluid. In high velocity fluids, the tip of metal cap 24 may be shaped to minimize fluid drag on the surface of metal cap 24. In some examples, metal cap 24 may be constructed of a metal alloy, a pure metal, or a metal composite material. In other examples, metal cap 24 may be different type of conductive material. Other non-metallic conductive materials may include composites, carbon derived materials, and other such materials. For example, metal cap 24 may be constructed of a thermally conductive epoxy or a thermally conductive thermoplastic. In either of these examples, the thermally conductive epoxy or thermally conductive thermoplastic may be molded over temperature sensing element 26, with or without thermally conductive material 70. In these examples, cap seal 38 may not be necessary.

Figure 6:
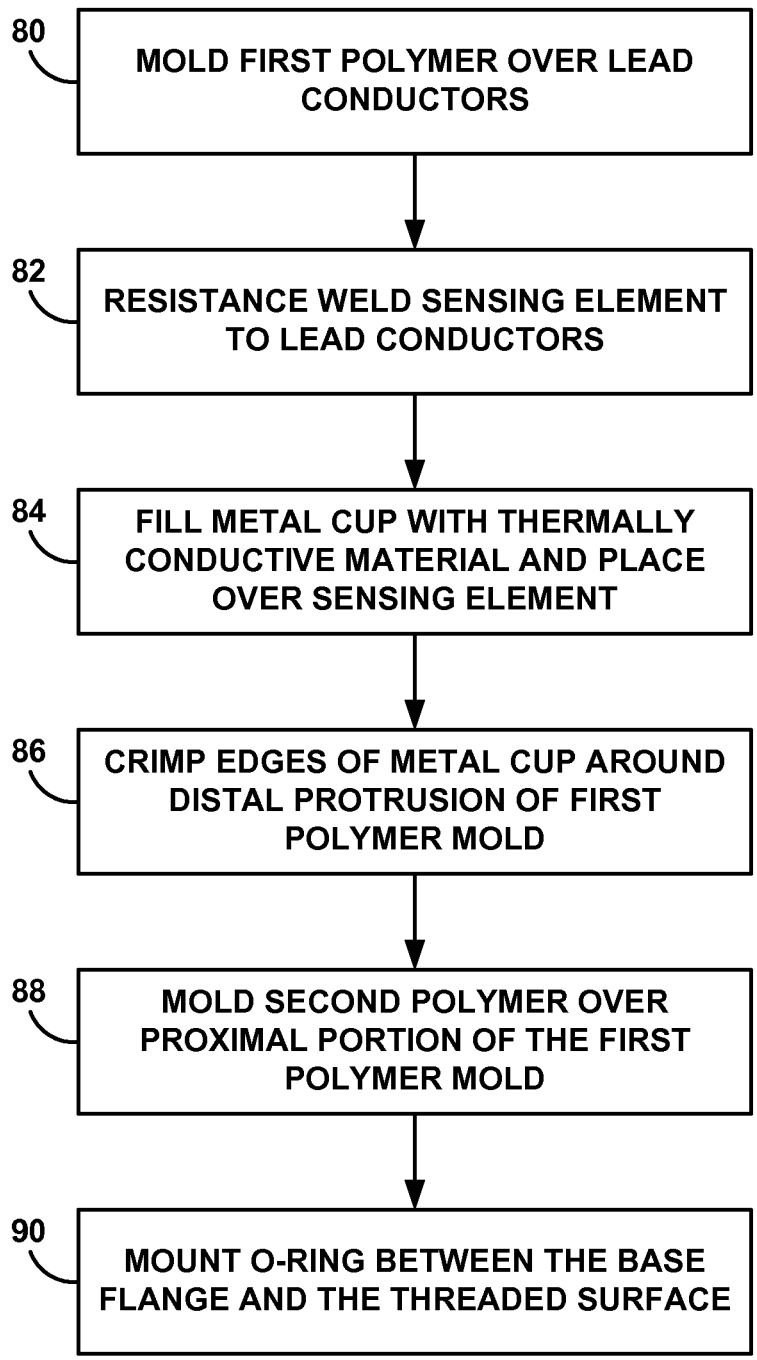
FIG. 6 is a flow chart of an example method for manufacturing a temperature sensor of FIG. 4 with an overmold outer polymer body.

FIG. 6 is a flow chart of an example method for manufacturing temperature sensor 40 of FIG. 4 with an overmolded outer polymer body 44. Although FIG. 6 is described within respect to temperature sensor 40 of FIG. 4, similar methods may also be used to construct temperature sensor 12 or other polymer body temperature sensors. As shown in FIG. 6, the first step is to mold the first polymer over lead conductors 62 to create inner polymer body 42 (80). In other examples, polymer body 42 may be molded to define channels 63 for later insertion of lead conductors 62. Next, temperature sensing element 56 is resistance welded to lead conductors 62 (82).

Metal cap 54 may then be filled with thermally conductive material 70 and placed over temperature sensing element 56 to cover the sensing element (84). In some examples, metal cap 54 may be pre-filled with thermally conductive material 70. The cap edges 78 of metal cap 54 are then crimped around the distal terminal protrusion 52 of inner polymer body 42 created by the first polymer mold to secure metal cap 54 to terminal protrusion 52 (86). In general, cap edges 78 secure metal cap proximate to temperature sensing element 56. Up to this point, inner polymer body 42 and temperature sensing element may be used for any application of temperature sensor 40, but inner polymer body 42 may be formed with different shapes and dimensions for various applications as well.

Outer polymer body 44 can then be molded over inner polymer body 42 to fit any application for temperature sensor 40. A second polymer is may be molded over at least the proximal portion of the first polymer mold, e.g., inner polymer body 42, to create the overmolded outer polymer body 44 (88). Outer polymer body 44 may include connector portion 46, flange 48 distal of connector portion 46, and threaded fixation surface 50 distal of flange 48 and proximal to temperature sensor element 56. Finally, fluid seal 60 is mounted between the base of flange 48 and the treaded structure of fixation surface 50 (90).

In some examples, the first polymer and the second polymer may be the same type of polymer material, i.e., inner polymer body 42 and outer polymer body 44 are constructed of a single type of polymer material. A single type of polymer for both bodies 42 and 44 may promote re-melting of the first polymer when the second polymer is overmolded to form a more integrated polymer body. In other examples, the first polymer and the second polymer may be different types of polymers. Different types of polymers may be used for compatibility with fluid chemistry, fluid temperatures, fluid pressure, or mounting surface temperatures, as some examples.

Figure 7A:
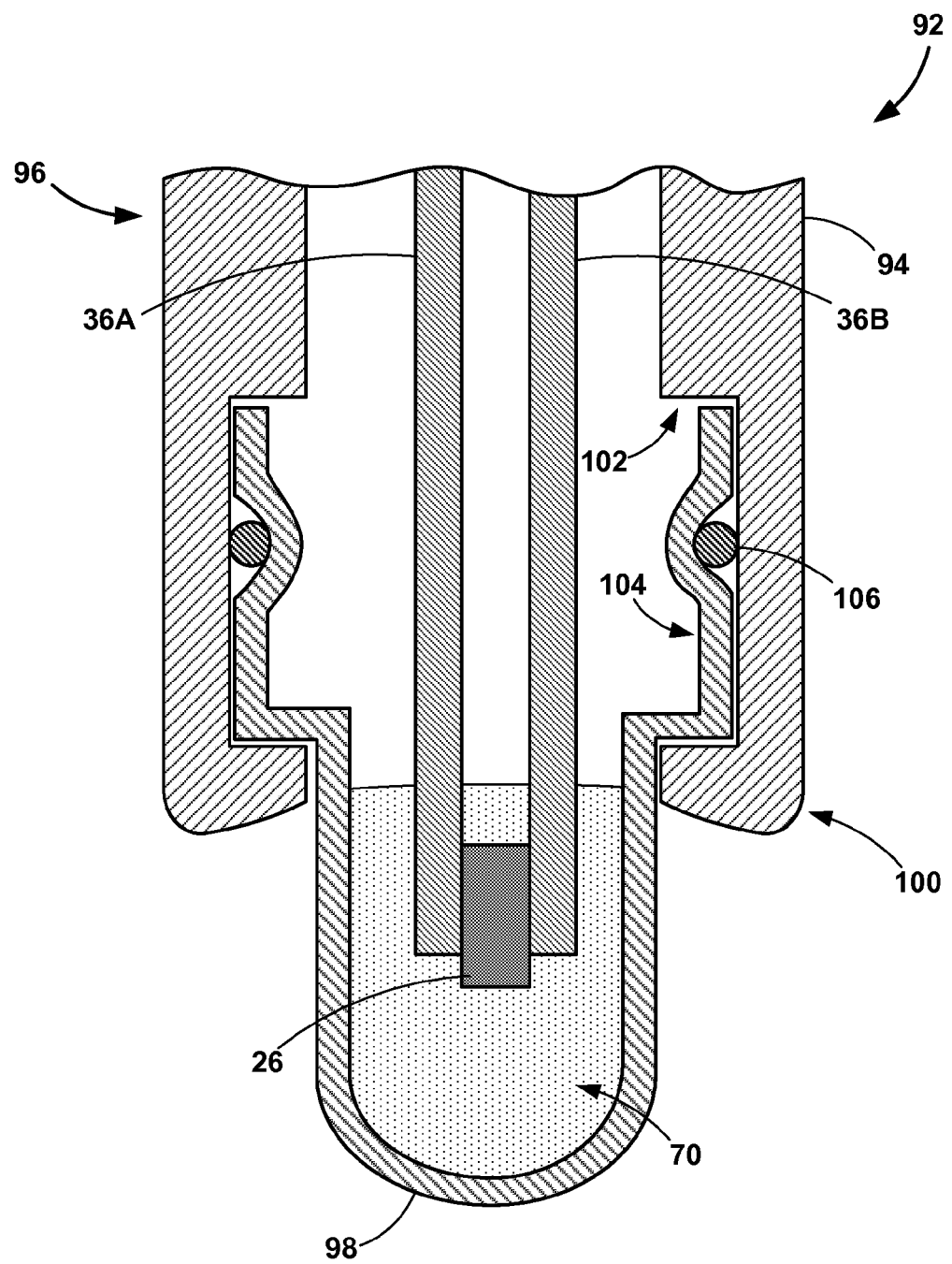
FIGS. 7A and 7B are conceptual diagrams of an example temperature sensor with a latch attachment mechanism for a thermally conductive cap.
Figure 7B:
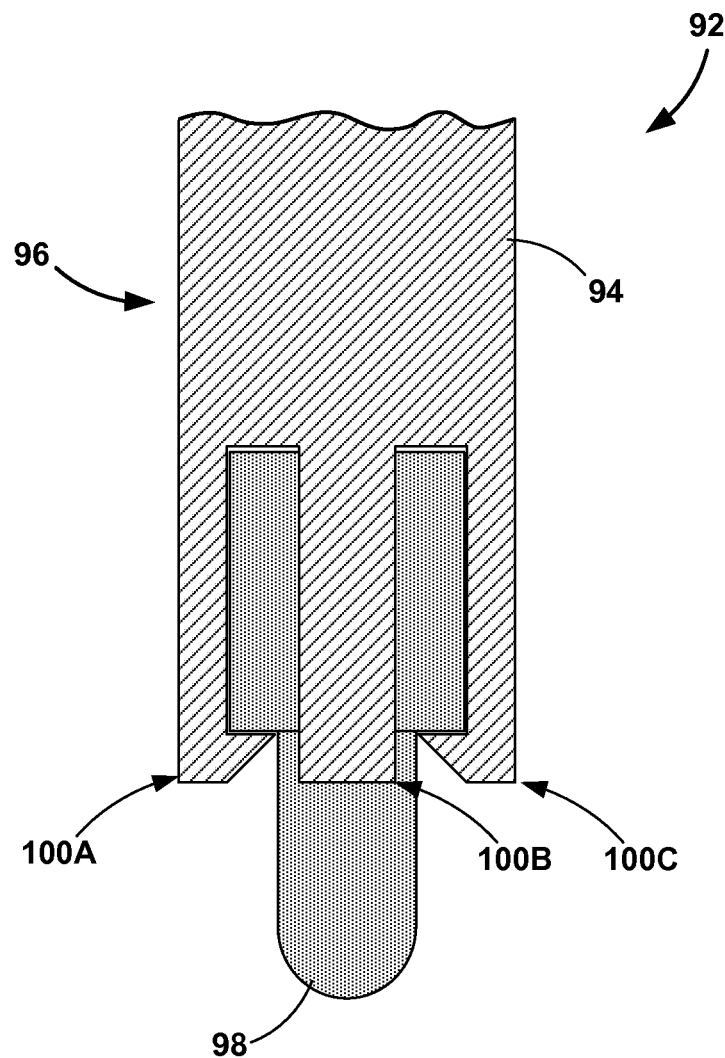

FIGS. 7A and 7B are conceptual diagrams of temperature sensor 92 with a latch attachment mechanism for thermally conductive cap 98. FIG. 7A is a cross-sectional diagram of temperature sensing temperature sensing element 26 at the distal tip of temperature sensor 92. Temperature sensor 92 may be substantially similar to temperature sensors 12 and 40 described herein. However, temperature sensor 92 utilizes a latch attachment mechanism to secure thermally conductive cap 98. Thermally conductive cap 98 may be substantially similar to metal cap 24.

As shown in FIG. 7A, thermally conductive cap 98 is disposed within the distal end of terminal protrusion 96 of polymer body 94. Conductors 36 are also disposed within polymer body 94 and electrically coupled to temperature sensing element 26. In addition to thermally conductive cap 98 sealing temperature sensing element 26 from target fluid, thermally conductive material 70 may be disposed within thermally conductive cap 98. Thermally conductive cap 98 may be constructed of metal or some other conductive material.

Thermally conductive cap 98 may be retained within polymer body 94 by latch 100, such that cap base 104 extends into cavity 104 formed by latch 100. Cap base 104 may have a larger diameter than the edge of latch 100 to retain thermally conductive cap 98 within polymer body 94. For installation of thermally conductive cap 98, latch 100 (and other similar latches around the circumference of polymer body 94) may extend away from thermally conductive cap 98 until latch 100 returns inward to retain thermally conductive cap 98. In some examples, thermally conductive cap 98 may alternatively, or in addition, deflect inward against latch 100 during installation. Cap base 104 also contacts cap seal 106 (e.g., a rubber o-ring) to prevent target fluid from entering temperature sensor 92.

FIG. 7B is a perspective view of the outside of temperature sensor 92 shown in FIG. 7A. As shown in FIG. 7B, latches 100A, 100B, and 100C (collectively, "latches 100") are provided to the outside of thermally conductive cap 98. Four latches 100 may be provided, with the fourth latch not visible in FIG. 7B. In this manner, latches 100 retain thermally conductive cap 98 within terminal protrusion 96 of polymer body 94. Although four latches are shown in the example of FIG. 7B, one or more latches 100 may be provided in any examples of temperature sensor 92.

Figure 8:
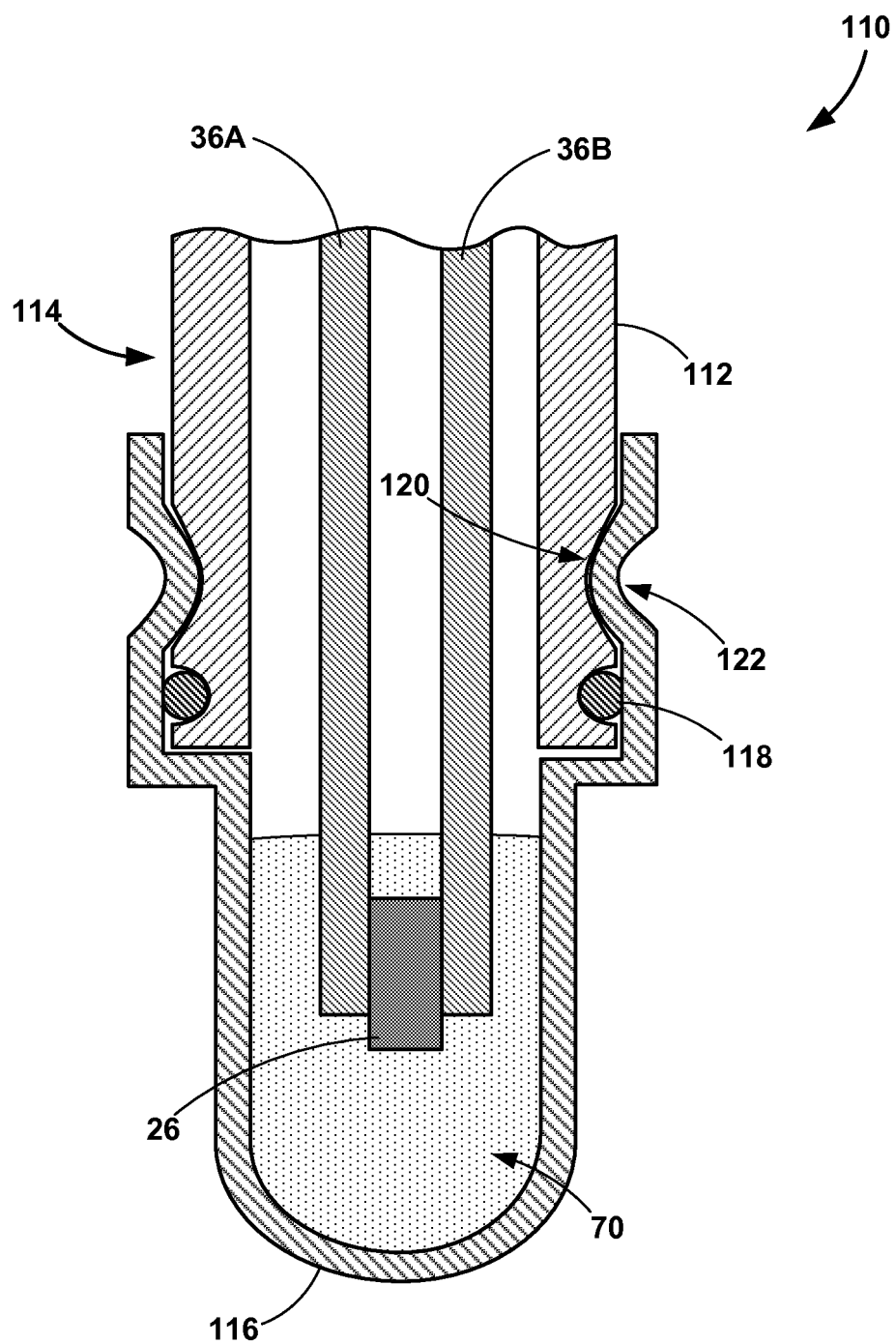
FIG. 8 is a cross-sectional diagram of an example temperature sensor with a circular crimp attachment mechanism for a thermally conductive cap.

FIG. 8 is a cross-sectional diagram of example temperature sensor 110 with a circular crimp attachment mechanism for thermally conductive cap 116. Temperature sensor 110 may be substantially similar to temperature sensors 12 and 40 described herein. However, temperature sensor 110 utilizes a circular crimp 112 mating to circular detent 120 to secure thermally conductive cap 116. Thermally conductive cap 116 may be substantially similar to metal cap 24.

As shown in FIG. 8, thermally conductive cap 116 is disposed within the distal end of terminal protrusion 114 of polymer body 112. Conductors 36 are also disposed within polymer body 112 and electrically coupled to temperature sensing element 26. In addition to thermally conductive cap 116 sealing temperature sensing element 26 from target fluid, thermally conductive material 70 may be disposed within thermally conductive cap 116. Thermally conductive cap 116 may be constructed of metal or some other conductive material.

Thermally conductive cap 116 may be retained on the outside surface of polymer body 112 by circular crimp 122 formed in the base of thermally conductive cap 116. Circular crimp 122 biases against circular detent 120 formed on the exterior surface of polymer body 112. For installation of thermally conductive cap 116, thermally conductive cap 116 may be positioned over polymer body 112 and a crimp tool may compress the base of thermally conductive cap 116 into circular detent 120. In other examples, one or more crimp/detent interfaces may be used to secure thermally conductive cap 116 to polymer body 112 instead of a circular crimp/detent interface. Thermally conductive cap 116 also contacts cap seal 118 (e.g., a rubber o-ring) to prevent target fluid from entering temperature sensor 110.

Figure 9:
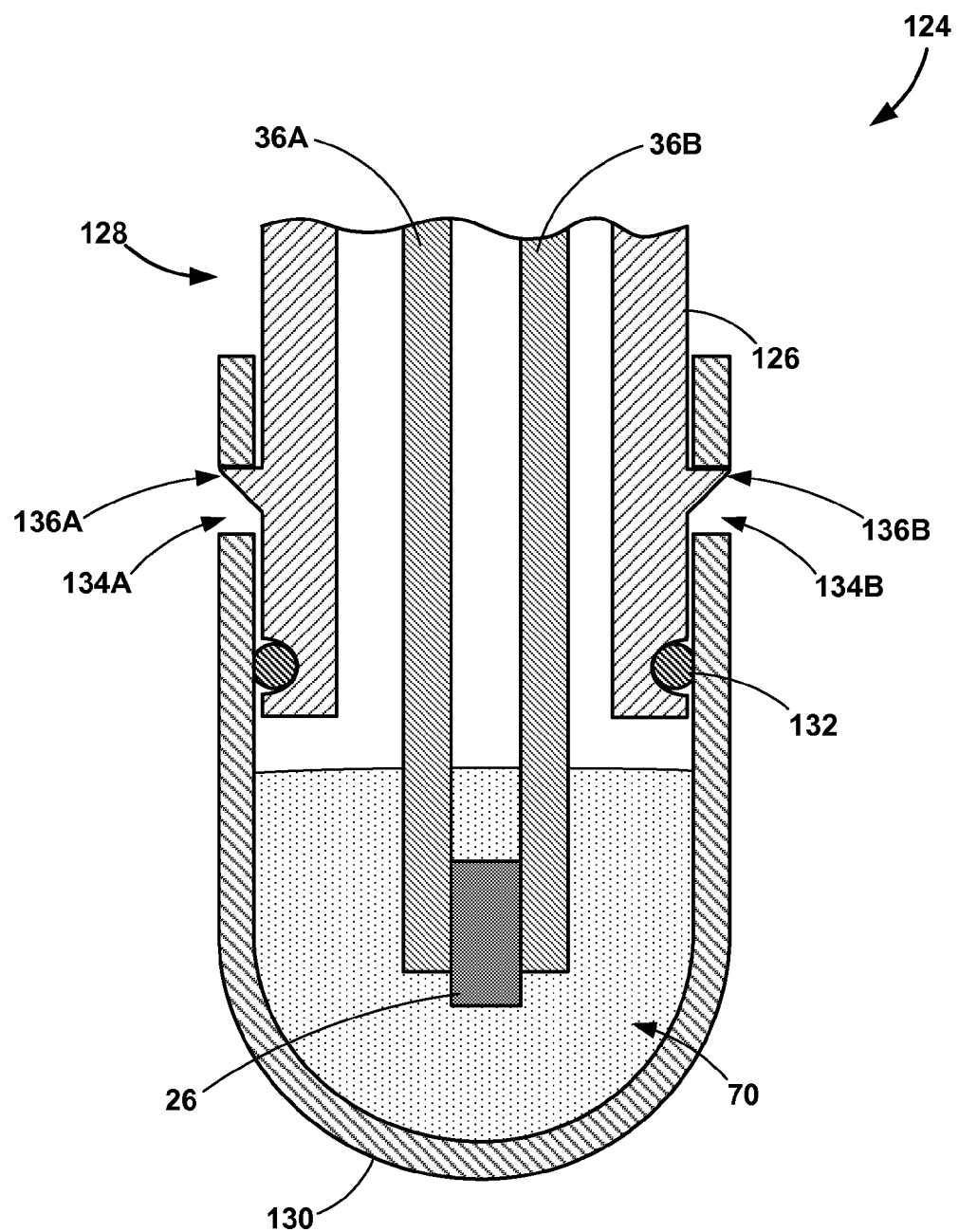
FIG. 9 is a cross-sectional diagram of an example temperature sensor with a snap attachment mechanism for a thermally conductive cap.

FIG. 9 is a cross-sectional diagram of example temperature sensor 124 with a snap attachment mechanism for thermally conductive cap 130. Temperature sensor 124 may be substantially similar to temperature sensors 12 and 40 described herein. However, temperature sensor 124 utilizes snap 136A and 136B (collectively "snaps 136") mating to cap holes 134A and 134B (collectively "cap holes 134") to secure thermally conductive cap 130. Thermally conductive cap 130 may be substantially similar to metal cap 24.

As shown in FIG. 9, thermally conductive cap 130 is disposed within the distal end of terminal protrusion 128 of polymer body 126. Conductors 36 are also disposed within polymer body 126 and electrically coupled to temperature sensing element 26. In addition to thermally conductive cap 130 sealing temperature sensing element 26 from target fluid, thermally conductive material 70 may be disposed within thermally conductive cap 130. Thermally conductive cap 130 may be constructed of metal or some other conductive material.

Thermally conductive cap 130 may be retained on the outside surface of polymer body 126 by snaps 136 formed in and extending out from polymer body 126. Snaps 136 may have a geometry that allows thermally conductive cap 130 to slide onto polymer body 126 and prevents thermally conductive cap 130 from being removed from polymer body 126. For example, the distally facing side of snap 136A may have a ramp and the proximally facing side of snap 136A may have a substantially perpendicular surface that contacts an edge of cap hole 136A. In this manner, thermally conductive cap 130 includes cap holes 134 that receive a respective one of snaps 136. During installation, one or both of thermally conductive cap 130 and polymer body 126 may deflect as snaps 136 slide within thermally conductive cap 130. Once each of snaps 136 is positioned within a respective one of cap holes 134, snaps 136 secure thermally conductive cap 130 to polymer body 126. Although two snaps 136 are shown in the example of FIG. 9, only one, or more than three, snaps and corresponding cap holes may be provided in temperature sensor 124. Thermally conductive cap 130 also contacts cap seal 132 (e.g., a rubber o-ring) to prevent target fluid from entering temperature sensor 124.

The devices described herein may provide various advantages. For example, a polymer body that contacts the mounting surface for the temperature sensor may thermally insulate a temperature sensing element from the mounting surface to reduce temperature measurement errors due to thermal gradient errors. In addition, the temperature sensors may provide a fast response time to changing temperatures with a metal cap that contacts the target fluid. In another example, a two stage mold of the polymer body may provide an inner polymer body that can be customizable to different applications with an overmold forming the outer polymer body. The polymer body may be formed into various dimensions of the connector portion, the terminal protrusion, the fixation surface, and the flange.

Various embodiments of the invention have been described. For example, a number of examples of temperature sensors and features for temperature sensors have been described. Although many of the examples have been described in the context of an internal combustion engine, the described temperature sensors may be useful in a wide variety of other devices and structures. These and other embodiments are within the scope of the following claims.

The invention claimed is:

1. A temperature sensor comprising:
   a thermally insulative polymer body defining at least one lead channel and comprising:
      a connector portion at a proximal end of the polymer body;
      a terminal protrusion disposed at a distal end of the polymer body;
      a flange disposed between the proximal end and the distal end of the polymer body, wherein the flange is configured to mate with an assembly tool; and
      a fixation surface disposed between the flange and the distal end of the polymer body;
   at least one lead conductor disposed within the at least one lead channel;
   a temperature sensing element electrically coupled to the at least one lead conductor and configured to detect a temperature of a fluid, wherein the temperature sensing element is disposed distal of the terminal protrusion; and
   a thermally conductive cap disposed completely distal of the fixation surface of the polymer body and over the temperature sensing element and at least a portion of the terminal protrusion, wherein the thermally conductive cap is configured to seal the temperature sensing element from the fluid.

2. The temperature sensor of claim 1, wherein the polymer body thermally insulates the temperature sensing element and the at least one lead conductor from a mounting surface, and wherein the fixation surface is configured to mate with the mounting surface.

3. The temperature sensor of claim 1, wherein the polymer body comprises:
   a first polymer mold that defines at least a portion of the at least one lead channel and defines the terminal protrusion; and
   a second polymer mold disposed over at least a portion of the first polymer mold, wherein the second polymer mold defines the connector portion, the flange, and the fixation surface.

4. The temperature sensor of claim 3, wherein the first polymer mold and the second polymer mold are constructed of one of a single type of polymer material or different types of polymer materials.

5. The temperature sensor of claim 1, further comprising a thermally conductive material disposed within the thermally conductive cap, wherein the thermally conductive material thermally couples the temperature sensing element to the thermally conductive cap.

6. The temperature sensor of claim 1, wherein a cap length of the thermally conductive cap is less than a terminal protrusion length and the cap length is less than 25 percent of a polymer body length.

7. The temperature sensor of claim 1, wherein the thermally conductive cap comprises a metal cap that includes a single wall, and wherein the single wall of the metal cap has a thickness between approximately 0.1 millimeters and 2.0 millimeters.

8. The temperature sensor of claim 1, further comprising a fluid seal disposed on an outer surface of the polymer body between the flange and the fixation surface.

9. The temperature sensor of claim 1, wherein the connector portion is a configured to accept an electrical connector that couples to the at least one lead conductor, the flange comprises a hexagonal exterior surface around a circumference of the polymer body, and the fixation surface comprises a threaded structure configured to mate with a threaded mounting surface.

10. The temperature sensor of claim 1, wherein the fluid is one of a lubricant, a coolant, or a fuel associated with an internal combustion engine.

11. The device of claim 1, wherein the thermally conductive cap comprises a cap edge, and wherein the cap edge of the thermally conductive cap is one of crimped, folded, or bent to a portion of the terminal protrusion to attach the thermally conductive cap to the terminal protrusion.

12. The device of claim 1, wherein the terminal protrusion comprises a circular detent, and wherein a circular crimp of the thermally conductive cap biases against the circular detect to secure the thermally conductive cap to the terminal protrusion of the polymer body.

13. The device of claim 1, wherein the terminal protrusion comprises one or more snaps and the thermally conductive cap comprises one or more cap holes, wherein each of the one or more snaps positioned within the respective one or more cap holes secures the thermally conductive cap to the terminal protrusion.

14. A device comprising:
a thermally insulative inner polymer body defining at least a portion of one or more lead channels and comprising a terminal protrusion disposed at a distal end of the inner polymer body;
a thermally insulative outer polymer body surrounding a portion of the inner polymer body and comprising:
a connector portion at a proximal end of the outer polymer body;
a threaded fixation surface at a distal end of the outer polymer body, wherein at least a portion of the threaded fixation surface surrounds the portion of the inner polymer body; and
a flange disposed between the proximal end and the threaded fixation surface of the outer polymer body, wherein the flange is configured to mate with an assembly tool;
at least one lead conductor disposed within the one or more lead channels;
a temperature sensing element electrically coupled to the at least one lead conductor and configured to detect a temperature of a fluid, wherein the temperature sensing element is disposed distal of the terminal protrusion; and
a thermally conductive cap disposed completely distal of the threaded fixation surface of the outer polymer body and over the temperature sensing element and at least a portion of the terminal protrusion, wherein the thermally conductive cap is configured to seal the temperature sensing element from the fluid.

15. The device of claim 14, wherein both the inner polymer body and outer polymer body insulate the temperature sensing element and the at least one lead conductor from a mounting surface, and wherein the threaded fixation surface is configured to mate with the mounting surface.

16. The device of claim 14, wherein the inner polymer body and the outer polymer body are constructed of one of a single type of polymer material or different types of polymer materials.

17. The device of claim 14, wherein the thermally conductive cap comprises a thermally conductive material, and the thermally conductive material thermally couples the temperature sensing element to the thermally conductive cap.

18. The device of claim 14, wherein:
a thermally conductive cap length is less than a terminal protrusion length and the thermally conductive cap length is less than 25 percent of a polymer body length; and
the thermally conductive cap comprises a single wall, and wherein the single wall a thickness between approximately 0.1 millimeters and 2.0 millimeters.

19. The device of claim 14, wherein the connector portion is a configured to accept an electrical connector that couples to the at least one lead conductor, the flange comprises a hexagonal exterior surface around a circumference of the polymer body, and the threaded fixation surface is configured to mate with a threaded mounting surface.

20. The device of claim 14, wherein the fluid is one of a lubricant, a coolant, or a fuel associated with an internal combustion engine.

* * * * *